United States Patent [19]
Amir et al.

[11] Patent Number: 5,497,624
[45] Date of Patent: Mar. 12, 1996

[54] METHOD OF AND APPARATUS FOR PRODUCING POWER USING STEAM

[75] Inventors: Nadav Amir, Rehovot; Lucien Y. Bronicki, Yavne, both of Israel

[73] Assignee: Ormat, Inc., Sparks, Nev.

[21] Appl. No.: 288,762

[22] Filed: Aug. 11, 1994

Related U.S. Application Data

[63] Continuation of Ser. No. 176,690, Jan. 3, 1994, abandoned, which is a continuation of Ser. No. 989,918, Dec. 11, 1992, abandoned, which is a continuation of Ser. No. 730,526, Jul. 15, 1991, abandoned, which is a continuation of Ser. No. 444,565, Dec. 1, 1989, abandoned.

[30] Foreign Application Priority Data

Dec. 2, 1988 [IL] Israel .......................................... 088571

[51] Int. Cl.⁶ ........................................................ F03G 7/00
[52] U.S. Cl. ........................... 60/641.5; 60/641.2; 60/655; 60/678; 60/718
[58] Field of Search ............................... 60/641.2, 641.5, 60/651, 655, 671, 698, 716, 718

[56] References Cited

U.S. PATENT DOCUMENTS

| | | | |
|---|---|---|---|
| 2,927,428 | 3/1960 | Sala | 60/641.2 |
| 3,257,806 | 6/1966 | Stahl | 60/655 |
| 3,409,782 | 11/1968 | Bronicki . | |
| 3,413,805 | 12/1968 | Heller et al. . | |
| 3,812,377 | 5/1974 | Malone | 60/719 |
| 3,851,474 | 12/1974 | Heller | 60/655 X |

(List continued on next page.)

FOREIGN PATENT DOCUMENTS

| | | |
|---|---|---|
| 2734925 | 2/1979 | Germany . |
| 188219 | 11/1966 | U.S.S.R. . |
| 556230 | 5/1977 | U.S.S.R. . |
| 585300 | 12/1977 | U.S.S.R. . |
| 630441 | 9/1978 | U.S.S.R. . |
| 646071 | 2/1979 | U.S.S.R. . |
| 646070 | 2/1979 | U.S.S.R. . |
| 1101562 | 8/1979 | U.S.S.R. . |

OTHER PUBLICATIONS

English Language Abstract of JP-57-168011.
"The Geysers—Three Decades of Achievement: A Window on the Future," *Transactions*, vol. 13. Geothermal Resources Council 1989 Annual Meeting, 1–4 Oct. 1989, Santa Rosa, California.
"California Geothermal," Bill Rintoul, *Pacific Oil World*, Jan., 1989.
"The Coso Success Story," Bill Rintoul. *Pacific Oil World*, Feb. 1989.
V. Y. Ruzhkin, "Steam Power Plants", Eneriya Publishers, 1967, pp. 207,242,243 and 249 and an English language translation.
V. Y. Ruzhkin, "Thermal Power Stations", Eneriya Publishers, 1967, pp. 190–193, 200–201, 210–211 and an English language translation.
Optimisation of Geothermal Power Plant by Use of Freon Vapour Cycle, V. K. Jonsson et al., Timarit VFI (1969), 17 pages.

*Primary Examiner*—Stephen F. Husar
*Attorney, Agent, or Firm*—Sandler, Greenblum & Bernstein

[57] ABSTRACT

A power plant operating on steam for producing electric power including a plurality of integrated power plant unit modules each having a steam turbine responsive to the steam and producing heat depleted steam, a steam condenser associated with the steam turbine operating at a pressure no less than atmospheric pressure for collecting non-condensable gases and condensing the heat depleted steam and vaporizing organic fluid applied to the condenser, a closed organic Rankine cycle turbine operating on the organic fluid and a single electric generator driven by the steam turbine and the organic Rankine cycle turbine for producing electric power, and also including means for supplying in parallel the steam to each steam turbine in each of the modules. A method for producing electric power using steam is also described.

62 Claims, 5 Drawing Sheets

U.S. PATENT DOCUMENTS

| | | | |
|---|---|---|---|
| 3,862,545 | 1/1975 | Ellis et al. | 60/641.5 |
| 4,412,422 | 11/1983 | Rossi | 60/719 X |
| 4,476,674 | 10/1984 | Berman | 60/39.182 |
| 4,476,684 | 10/1984 | Phillips . | |
| 4,537,032 | 8/1985 | Kaplan . | |
| 4,542,625 | 9/1985 | Bronicki | 60/655 |
| 4,558,568 | 12/1985 | Hoshino et al. . | |
| 4,578,953 | 4/1986 | Krieger et al. . | |
| 4,871,295 | 10/1989 | Kaplan | 415/94 |
| 4,943,719 | 7/1990 | Akamine et al. . | |
| 5,038,567 | 8/1991 | Mortiz | 60/641.5 |

METHOD OF AND APPARATUS FOR PRODUCING POWER USING STEAM

This application is a continuation, of application, Ser. No. 08/176,690, filed Jan. 3, 1994, now abandoned, which is a continuation of application, Ser. No. 07/989,918, filed Dec. 11, 1992, now abandoned which is a continuation of application Ser. No. 07/730,526 filed Jul. 15, 1991, now abandoned, which is a continuation of application Ser. No. 07/444,565 filed Dec. 1, 1989, now abandoned.

TECHNICAL FIELD

This invention relates to producing power from steam and more particularly is concerned with a method of and apparatus for producing electric power from geothermal fluids using integrated units.

BACKGROUND OF THE INVENTION

Steam has been used for many years in the production of electric power. In particular, geothermal sources of steam have increasingly been utilized in recent times as sources of energy. Conventionally, steam turbines are used to convert geothermal steam exiting wells into electric power.

Recently, more extensive use of this source of energy has been achieved by using closed organic Rankine cycle turbines and quite often, a combination of steam turbines and closed organic rankine cycle turbines has been used in the production of power from these geothermal sources which many times contain non-condensable gases, for example carbon dioxide, hydrogen sulfide, etc., detrimental to the environment. Such a system is disclosed in U.S. Pat. No. 4,542,625, the disclosure of which is hereby incorporated by reference, where a steam condenser operating at pressure greater than atmospheric pressure is used to condense heat depleted steam exiting a steam turbine and collect the non-condensable gases by applying an organic fluid which is vaporized for use in running a closed organic cycle Rankine turbine. Subsequently, the condensate together with the non-condensable gases having been compressed are pumped back into a reinjection well rather than exhausting the gases into the free atmosphere. In such cases, it has been conventional to use one or more large steam turbines to produce power from the geothermal steam exiting the wells with a larger number of separate closed organic Rankine cycle turbines operating on the heat depleted steam exiting the steam turbines. A power plant of this type thus requires a rather extensive and costly distribution system having large diameter conduits for supplying the low pressure, heat depleted steam exiting the steam turbines to the closed organic cycle Rankine turbines and a reasonably sophisticated control system, since for example, the heat depleted steam must be handled even in the case of malfunction or closing down of one or more of the organic Rankine turbines. Furthermore, the malfunction or closing down of one or more of the organic Rankine turbines or even the reduction of the output of one or more of the organic Rankine turbines also normally causes a reduction in the operating efficiency of the steam turbines as the organic fluid acts as the cooling fluid of the steam condensers.

It is therefore an object of the present invention to provide a new and improved method of and apparatus for producing power from steam wherein the disadvantages as outlined are reduced or substantially overcome.

SUMMARY OF THE INVENTION

The present invention provides a method of and apparatus for producing power from steam, wherein, according to the invention, a power plant operates on the steam, the power plant comprising means for supplying in parallel steam from the steam source to a plurality of integrated power plant unit modules, each module comprising a steam turbine responsive to the steam producing heat depleted steam, a steam condenser associated with the steam turbine operating at a pressure preferably no less than atmospheric pressure for collecting non-condensable gases and condensing the heat depleted steam by vaporizing organic working fluid applied to the condenser, a closed organic Rankine cycle turbine operating on the organic working fluid and an associated preferably single electric generator driven by the steam turbine and the Rankine cycle turbine for producing electric power. Preferably, the means for supplying source steam to the power plant unit modules includes a control valve associated with each power plant module, with the present invention being also applicable to even one power plant unit module. Each power plant unit module further comprises an organic working fluid condenser for condensing said organic working fluid, the condenser preferably being air-cooled, and means for returning the condensed organic working fluid to the organic vaporizer contained in the steam condenser. Furthermore, means for compressing non-condensable gases present in the steam condensers contained in each said power plant module may be provided, the compressed non-condensable gases being vented into a reinjection well together with pressurized steam condensate produced in the steam condensers.

Preferably, the working fluid of the closed organic Rankine cycle turbines contained in the power plant modules is pentane with the present invention being suitable for operation on sources of geothermal steam as well as other heat sources such as steam available in industrial processes. Since in the present invention, the source steam is distributed to the various power plant unit modules substantially at the pressure of the steam source itself, the diameter of the distribution piping is relatively small. Also, as a consequence, the size of the control valves is relatively small, thus substantially reducing the cost of such installations. In addition, as the power plant modules each contain a steam turbine, a closed organic Rankine cycle turbine and preferably a single electric generator, improved economy, simpler operational controls and efficiency levels are provided by the present invention.

BRIEF DESCRIPTION OF THE DRAWINGS

Embodiments of the invention are described below by way of example, and with reference to the accompanying drawings wherein.

DETAILED DESCRIPTION

Figure 1A:
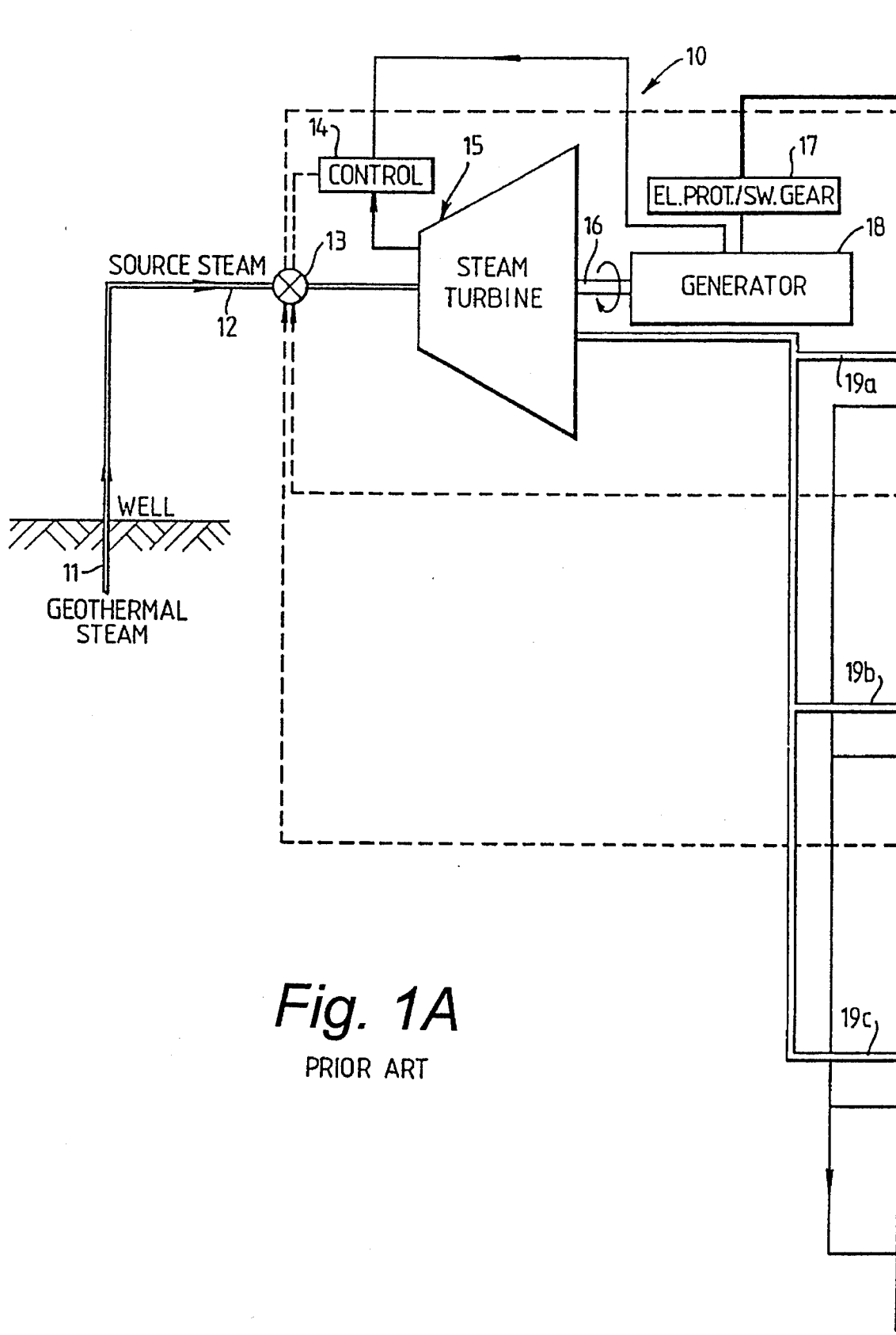
FIG. 1 represents a prior art geothermal power plant.
Figure 1B:
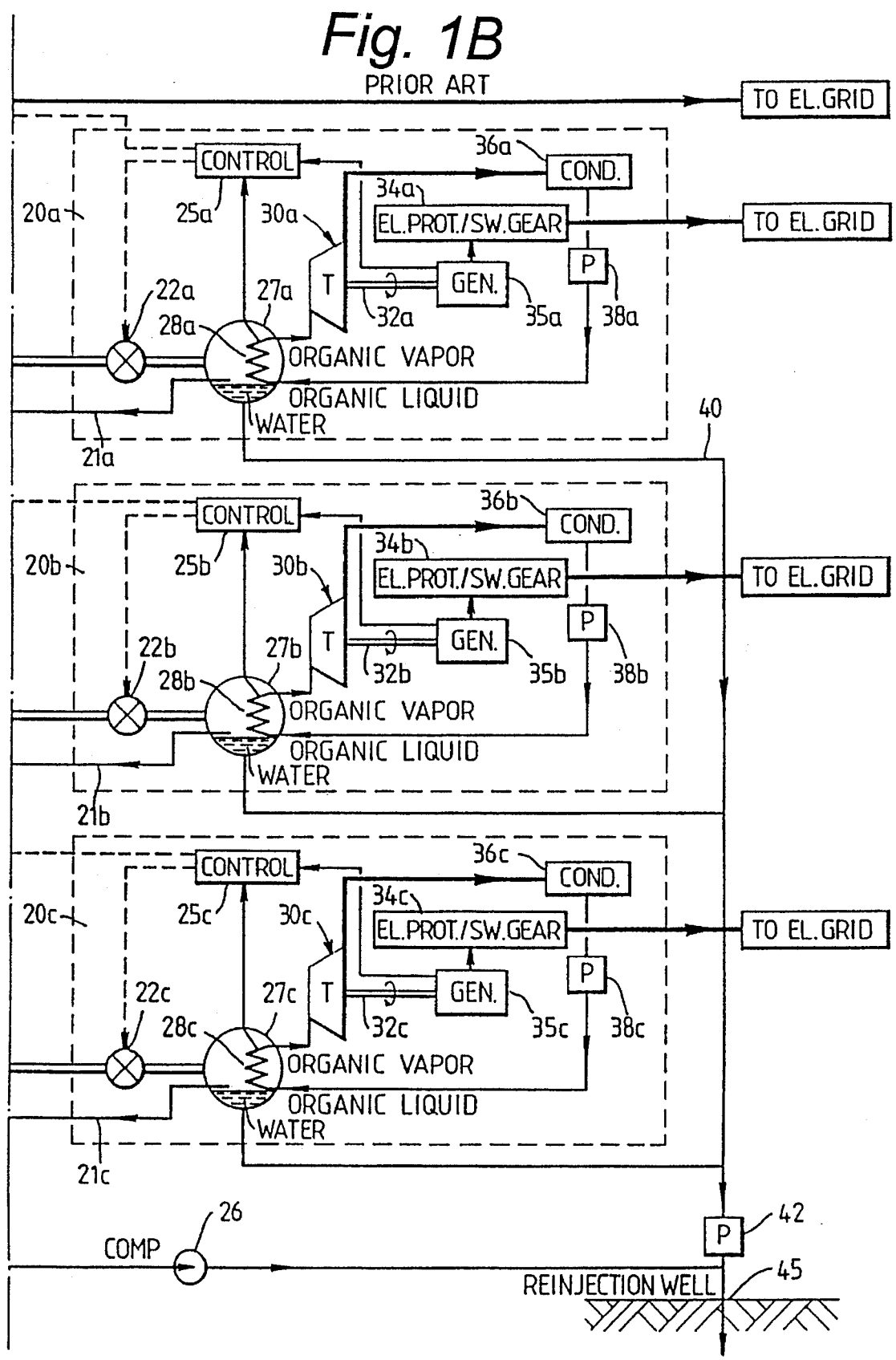

Referring now to the drawings, reference numeral 10 in FIG. 1 represents an example of a conventional geothermal power plant for generating electric power from geothermal steam, wherein steam from well 11 flows via conduit 12 and control valve 13 to steam turbine 15. The turbine extracts work from the steam and drives generator 18 provided to supply electric power to the electric grid via electric protection sub-system 17 using control 14. Usually electric protection sub-system 17 includes circuit breakers and other protection means. Also switch gears are used. Exhaust distribution conduits 19a, 19b and 19c are provided for supplying heat depleted steam exiting steam turbine 15 to steam condensers 27a, 27b, 27c using control valves 22a, 22b and 22c, controlled by controls 25a, 25b and 25c contained in closed Organic Rankine Cycle (ORC) power plant modules 20a, 20b, 20c respectively. Since the steam applied to the power plant modules is heat depleted steam exhausting steam turbine 15, its pressure is relatively low, pressures of 25 psia being common, and consequently, the diameter of conduits 19a, 19b and 19c is relatively large, e.g., approximately 140 cm, with valves 22a, 22b and 22c also being large in size making such installations quite expensive. Steam condensers 27a, 27b, 27c are preferably operated at above atmospheric pressures to facilitate the extraction of non-condensable gases contained in the steam from the system via compressor 26, with the condensate produced by the steam condensers and compressed gases being piped into reinjection well 45 using pump 42. Coils 28a, 28b, 28c present in steam condensers 27a, 27b and 27c containing organic fluid used to cool the condensers also operate as vaporizers of the organic working fluid of the ORC power plant modules, with the vaporized organic fluid produced in coils 28a, 28b, 28c being applied to vapor turbines 30a, 30b, and 30c drive generators 35a, 35b, and 35c provided for producing electric power supplied via switch gear and electric protection sub-systems 34a, 34b and 34c to the electric grid. Organic working fluid vapors exiting turbines 30a, 30b, and 30c are applied to organic working fluid condensers 36a, 36b and 36c where condensation takes place, the condensed organic fluid being returned by pumps 38a, 38b and 38c to vaporizer coils 28a, 28b and 28c completing the organic fluid cycle. Cooling water contained in cooling water means (not shown) can be used to cool these condensers, or, if preferred, air supplied by forced draft air cooling means (not shown), can be used to cool the condensers.

Module controls 25a, 25b and 25c, provided for controlling the amount of heat depleted steam reaching power plant modules 20a, 20b, and 20c, govern the degree of opening of control valves 22a, 22b and 22c in accordance with the monitored power produced by generators 35a, 35b and 35c and/or pressure in vaporized coils 28a, 28b and 28c. In addition, these controls provide control of the amount of source steam reaching steam turbine 15 via control valve 13. Thus, for example, if less electric power is to be supplied to the electric grid, the controls send a signal to control valves 22a, 22b and 22c to reduce their degree of opening, causing a decrease in the amount of heat depleted steam supplied to steam condensers 27a, 27b and 27c and thus decreasing the pressure in vaporizer coils 28a, 28b and 28c. Consequently, the output of organic vapor turbines 30a, 30b and 30c and their associated generators is reduced. In this case, the controls will also appropriately reduce the quantity of source steam reaching steam turbine 15 by bringing about an adjustment in the opening of control valve 13, reducing its operating pressure and thus also reducing the output of the steam turbine. This is due to the fact that the organic working fluid contained in each of the organic Rankine cycle (ORC) turbine modules acts as the cooling medium of the steam condensers of steam turbine 15. Furthermore, if one of the ORC power plant modules malfunctions, for example 20a, and is to be closed down, then control 25a will close control valve 22a and also consequently bring about an appropriate adjustment to valve 13, causing a change in the amount of source steam reaching steam turbine 15, also making this turbine operate at a pressure different from its nominal value at a thus lower efficiency level, Turning to FIG. 2, numeral 50 designates apparatus, according to the present invention for producing power from steam wherein distribution conduit 51A is provided for supplying geothermal steam originating from well 51 in parallel to steam turbines contained in a plurality of integrated power plant unit modules, three of such modules 55a, 55b and 55c being shown. However, the present Invention can also be applied to one power plant module. Separator 53 can be provided for separating hot geothermal liquid from steam contained in geothermal fluid existing well 51, while demumidifier 52 can be used to ensure that the moisture level in the steam is kept to a minimum. Source steam pressures of approximately 150 psia are common. Here, for convenience, we refer to power plant unit module 55a containing steam control valve 57a and steam turbine 60a for receiving the source steam and producing work therefrom by driving electric generator 65a via shaft 61a, the steam expanding in turbine 60a. The operation of valve 57a is controlled by control 56a. Steam condenser 62a, which preferably operates at pressures greater than atmospheric pressure facilitating the separation of non-condensable gases contained in the steam, is provided for condensing heat depleted steam exiting steam turbine 60a by cooling the steam with organic fluid applied to the condenser in coil 67a contained therein. Such an arrangement avoids the necessity for use of vacuum pumps. Compressor 59 is provided for compressing the non-condensable gases present in steam condenser 62a, the compressed gases flowing into exit conduit 79 located downstream from valve 77 where, together with condensate produced by the condenser and existing booster pump 76a, they are piped to reinjection well 80. Coil 67a also operates as a vaporizer of a closed Organic Rankine Cycle turbine, the organic working fluid contained in the coil being vaporized, with the vaporized fluid being applied to organic vapor turbine 70a where it expands and produces useful work by preferably also driving electric generator 65a via shaft 68a. An example of a suitable closed organic Rankine cycle turbine is disclosed in U.S. Pat. No. 3,409,782, the disclosure of which is hereby incorporated by reference. Preheater 71a can be provided so that hot geothermal liquid exiting separator 53 via booster pump 54A may preheat the organic fluid before it is supplied to coil 67a. Heat depleted geothermal liquid exiting preheater 71a preferably flows via conduit 78 to valve 77 for reinjection at well 80 via exit conduit 79. Valve 77 assists in maintaining relatively high pressures in conduit 54 and in the conduits connecting preheater 71a to pump 54A as well as in the conduits connected to the outlet of the preheater so that flashing of the brine flowing in these conduits is substantially eliminated. Preferably, pentane is used as the organic working fluid. However, other organic fluids such as Freons, etc., can be used. Preferably electric generator 65a is oversized compared to the capacities of steam turbine 60a and organic vapor turbine 70a, its generating capacity being preferably equal to the sum of the individual capacities of the steam turbine and vapor turbine. For example, the capacity of steam turbine 60a may be 1.5 MW with the capacity of organic vapor turbine 70a also being 1.5 MW, the capacity of generator 65a being in such case 3 MH, permitting the simultaneous operation of both the steam and vapor turbines at full capacity. If preferred, clutch 61a' can be interposed between steam turbine 60a and generator 65a, and clutch 68a' can be interposed between organic fluid turbine 70a and generator 65a in module 55a. Similarly, clutches 61b' and 68b' can be provided for module 55b, and clutches 61c' 68c' can be provided for module 55c. Alternatively, separate electric generators can be provided for each turbine when preferred. Organic fluid condenser 72a is provided for condensing organic vapor exiting vapor turbine 70a, the condenser being cooled by air supplied via forced air draft means or if preferred, by cooling water supplied to the condenser through suitable means, as shown in FIG. 2A. Pump 74a returns condensed organic fluid to coil 67a completing the organic fluid cycle. Power plant 50 is thus a hybrid power plant comprising a portion which operates on geothermal steam and a portion operating on an organic fluid, Thus as can be seen from FIG. 2, when apparatus 50 is operated, steam originating from well 51, supplied via conduit 51A after exiting separator 53 and dehumidifier 52 1s distributed to the various power plant unit modules by operating steam control valves 57a, 57b and 57c controlled by controls 56a, 56b and 56c. Since the steam is distributed to the power plant unit modules at pressures comparable with those of the source steam at the well 51, rather than at relatively low steam turbine exit pressures as is the case in conventional use, an example of which is shown in FIG. 1, the diameter of the distribution conduit is relatively small, e.g., approximately 50 cm when a pressure of around 150 psia is used. Furthermore, due to this, the size of control valves 57a, 57b and 57c is also relatively small, thus bringing about considerable savings. Steam reaching steam turbines 60a, 60b and 60c expands, does work and electric power is produced wherein shafts 61a, 61b and 61c drive electric generators 65a, 65b and 65c. Heat depleted steam exhausting turbines 60a, 60b and 60c is supplied to steam condensers 62a, 62b and 62c where it condenses, the condensate and non-condensable gases collected in the steam condensers being reinjected into well 80 wherein the condensate flows via conduit 75 using booster pumps 76a, 76b and 76c, while the non-condensable gases are compressed by compressor 59. Vaporized organic working fluid, produced in coils 67a, 67b and 67c after being heated in preheaters 71a, 71b and 71c by hot liquid exiting separator 53 is furnished to vapor turbines 70a, 70b and 70c where it expands, causing the turbines to rotate, their output also being applied to electric generators 65a, 65b and 65c which furnishes the electric power generated to the electric grid via protection circuits and appropriate switch gears, Thus, organic vapor turbines 70a, 70b and 70c also contribute to the generating capacity of generators 65a, 65b and 65c, the shared electric generators and electric components such as shared switch gears providing improved economy and also greater convenience of operation, Heat depleted organic vapors exiting turbines 70a, 70b and 70c are applied to organic fluid condensers 72a, 72b and 72c where they condense, the condensate produced being supplied to vaporizer coils 67a, 67b and 67c respectively using pumps 74a, 74b and 74c. Geothermal liquid exiting preheaters 71a, 71b and 71c is combined with condensate exiting booster pumps 76a, 76b and 76c using combining means for disposal into reinjection well 80 via valve 77.

Figure 2:
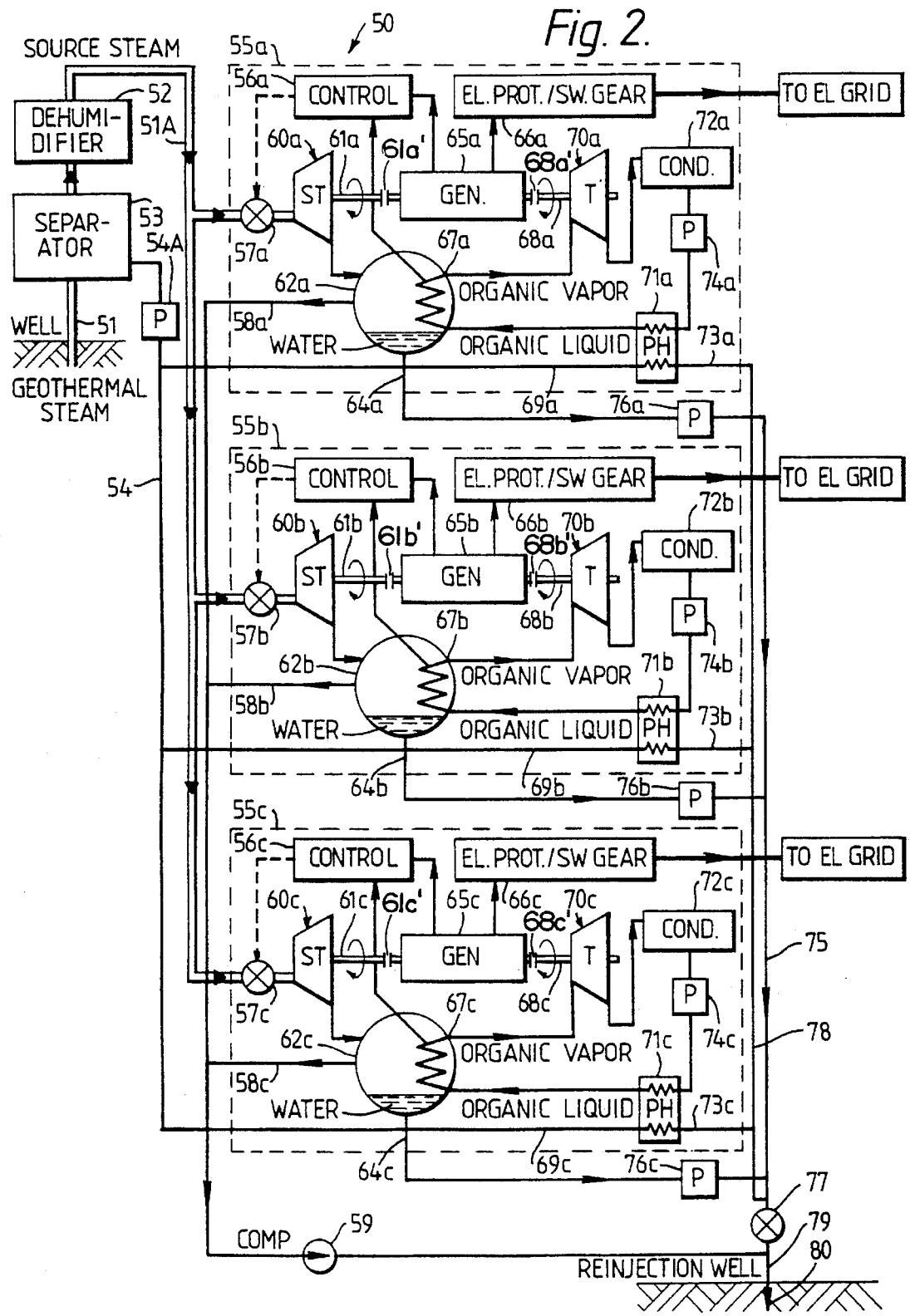
FIG. 2 shows a schematic block diagram of a geothermal power plant according to the present invention.
Figure 2A:
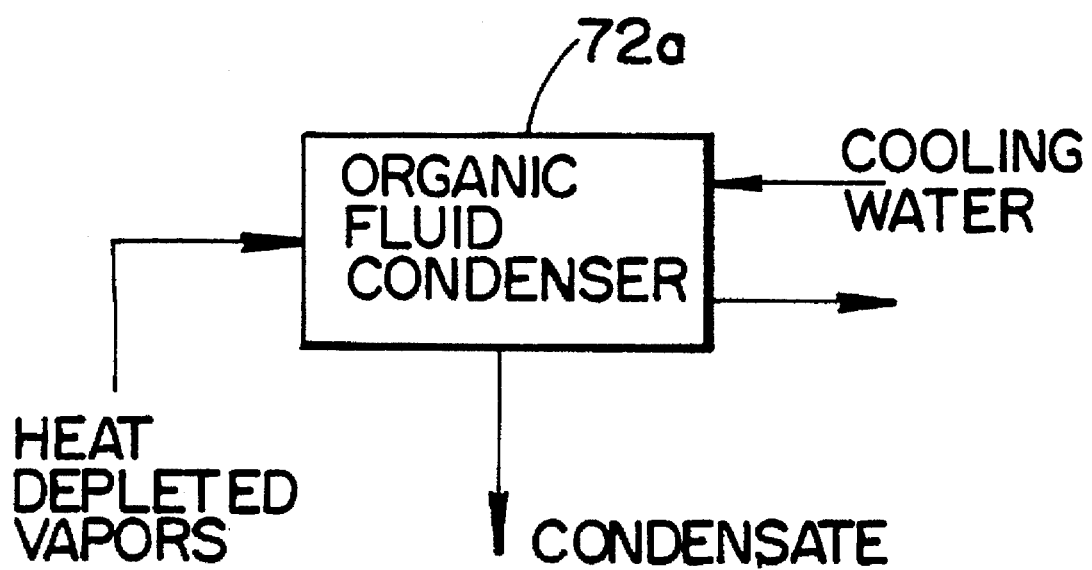
FIG. 2A shows a schematic diagram of an optional organic fluid condenser that can be used in the present invention.

In the embodiment shown In FIG. 2, controls of 56a, 56b and 56c control the level of electric power generated by the modules by monitoring the power level of the generators 65a, 65b and 65c and the pressure in vaporizer coils 67a, 67b and 67c and accordingly controlling the amount of steam supplied to the power plant unit modules using steam control valves 57a, 57b and 57c. For example, in normal operation. If the controls indicate that less current is to be supplied to the electric grid, the amount of source steam applied to only one power plant module, for example 55a, can be reduced by appropriately adjusting its control valve, causing less power to be supplied by this module to the electric grid, while permitting the other power plant modules to continue operating at their nominal values, maintaining their efficiency levels. Thus, in such a case, in module 55a, control 56a causes a decrease in the degree of opening of control valve 57a, permitting a smaller quantity of source steam to be supplied to steam turbine 60a, with steam condenser 62a consequently bringing about a reduction in the operating pressure of vaporizer coil 67a, causing a reduction in the work produced by vapor turbine 70a and steam turbine 60a with the power level generated by generator 65a consequently decreasing. Also, if one of the unit modules is not in operation due to malfunction or maintenance procedures, etc., the control of the module not operating will simply close its control valve with the other modules continuing to operate at their nominal values. Consequently, also here high efficiency levels will be maintained in the steam turbines contained in the other unit modules during their continued operation. This is in contrast with the conventional power plants, an example of which is shown in FIG. 1, where the closing down of one of modules 20a, 20b or 20c will also bring about reduction in the amount of steam supplied to steam turbine 15 in FIG. 1, via the partial closing of steam valve 13, causing the operating pressure of the steam turbine to change from its nominal value and consequently reducing its efficiency level. Thus, in the present invention, by including a steam turbine together with a closed organic rankine cycle turbine and preferably a single electric generator in each power plant module, relatively high efficiency operating levels, improved economy and also simpler control of the power producing apparatus are achieved, wherein only one steam control valve per module is present, eliminating the need for separate control valves for the steam turbine and organic rankine cycle turbines as was the case in the prior art. Also, the presence of a steam turbine together with a closed organic rankine cycle turbine integrated into each power plant module makes the construction of such power plants and their maintenance more convenient. The present invention saves, for example, the construction of a large bay for housing a steam turbine were constructed out in accordance with conventional prior art. Furthermore, if preferred, in a particular embodiment, pumps 74a, 74b and 74c, can also be mounted a common shaft with the steam and organic turbines, permitting the automatic start up of the ORC turbines. If preferable, in the present invention the modules can remain on hot stand-by supplying the generated electricity to auxiliaries, enabling them to be connected to the electric grid almost immediately when called upon.

In the present embodiment, combining condensate and to a lesser extent non-condensable gases with the geothermal liquid being piped for reinjection into well 80, brings about a reduction in the amount of mineral precipitation from the brines in the conduits leading to the reinjection well as well as in the well itself. This is primarily due to the low pH of the condensate, e.g. ~3–5. Such an effect is beneficial in reducing the fouling by precipitates, primarily silica, of the various piping and other components associated with the injection of fluid into the reinjection well. While in the present embodiment, brine exiting separator 53 is used to preheat organic fluid in the organic Rankine cycle turbines, the brine can merely be reinjected into a reinjection well without preheating the organic fluid with condensate and non-condensable gases being combined therewith to also reduce such mineral precipitation. Moreover, while in the present embodiment, a separator and dehumidifier are provided, the present invention is also applicable to situations where the nature of the geothermal source or steam is such that devices of this kind are not necessary.

Figure 3:
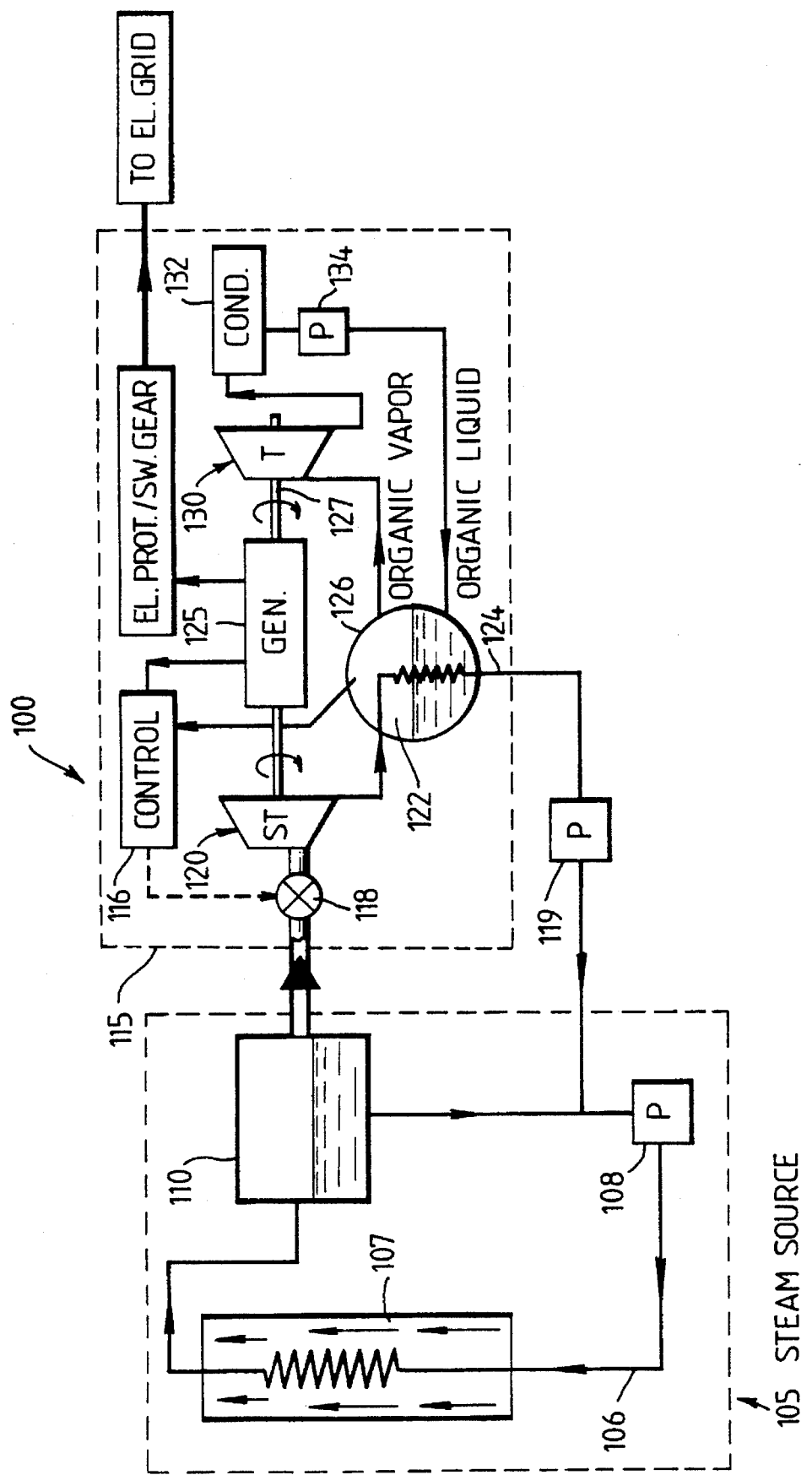
FIG. 3 shows a schematic of an embodiment of the present invention.

While this embodiment refers to the use of geothermal steam, the present invention is also suitable for use with other heat sources such as industrial fluids and steam, solar ponds and waste heat from industrial processes for example flue gases where, if necessary, an intermediate heat exchanger may be incorporated for transferring heat obtained from the source to the power plant unit module by generating steam. An example of such a use is shown in FIG. 3, wherein steam is generated from steam source 105 comprising heat source 107, in the form of hot flue gases, pressurized water circuit 106 having pump 108 and flash chamber 110 for producing steam. The integrated power plant module unit 115 comprising steam turbine 120 and closed organic rankine cycle turbine 130 basically operates in a similar manner to one of the modules described above with reference to FIG. 2 except that here no means for treating non-condensable gases are provided as, normally, no such gases are present. Steam condenser 122 also preferably operates at pressures no less than atmospheric pressure. Also booster pump 119 is provided for raising the pressure of liquid water condensate exiting steam condenser 122 and permitting it to flow into pressurized water circuit 106. If preferred, booster pump 119 can be an ejector pump, using the high pressure of liquid flowing in the pressurized water circuit. Use of the integrated power plant module in combination with the steam source shown in FIG. 3, which may be termed a pressurized water recuperator, permits efficient and economical conversion of heat to electricity due mainly to the high temperatures of the steam exiting the outlet of flash chamber 110 and entering steam turbine 120. Furthermore, in the present embodiment, the use of a superheater is avoided. Moreover, use of an organic fluid in portion of the power plant with such types of heat sources is distinctly advantageous due to their thermodynamic properties, for example their relatively low boiling temperature, the minimal wetness of vapors achieved in expansion at the vapor turbines and also the relatively high preheat (i.e. the ratio of the amount of heat per unit time required to raise the temperature of the organic working liquid from the condenser temperature to the vaporization temperature, remaining in liquid form, to the total amount of heat per unit time required to evaporate the working fluid) levels obtained when using appropriate organic fluids. The use of the present invention can be particularly beneficial in situations where the use of apparatus containing flammable materials is forbidden. In such cases, the steam turbine portion of the unit module can be located in the forbidden areas, permitting electric power to be produced even in such situations.

It is believed that the advantages and improved results furnished by the method and apparatus of the present invention are apparent from the foregoing description of the preferred embodiments of the invention. Various changes and modifications may be made without departing from the spirit and the scope of the invention as described in the claims that follow.

What is claimed is:

1. A power plant operating on steam for producing electric power comprising:

a) a plurality of integrated power plant unit modules each having a steam turbine responsive to said steam and producing power and heat depleted steam, a steam condenser associated with each said steam turbine operating at a pressure no less than atmospheric pressure for collecting non-condensable gases and condensing said heat depleted steam and vaporizing organic fluid applied to said condenser, and a closed organic Rankine cycle turbine operating on said organic working fluid for producing power;

b) steam supply means for supplying in parallel said steam to each steam turbine in each said modules;

c) a control valve associated with and positioned before the steam turbine contained in each said power plant module for controlling the amount of steam supplied to said steam turbine via said steam supply means;

d) means for compressing non-condensable gases collected in steam condensers contained in each said power plant module, and means for venting the compressed non-condensable gases into a reinjection well; and e) wherein the organic fluid is pentane.

2. The power plant according to claim 1 wherein each said integrated power plant module further comprises a single electric generator driven by the steam turbine and closed organic Rankine cycle turbine contained in each said power plant module for producing electric power.

3. A power plant according to claim 2 wherein the generator of each module is a single electric generator interposed between and driven individually by both said steam turbine and said organic Rankine cycle turbine of the module.

4. A power plant operating on geothermal fluid for producing electric power comprising:

a) a separator for separating said geothermal fluid into geothermal steam and geothermal liquid;

b) a plurality of integrated power plant unit modules each having a steam turbine responsive to said steam and producing heat depleted steam, a steam condenser associated with each steam turbine operating at a pressure no less than atmospheric pressure for collecting non-condensable gases and condensing said heat depleted steam and vaporizing organic fluid applied to said condenser, a closed organic Rankine cycle turbine operating on said organic fluid and a single electric generator driven by said steam turbine and said organic Rankine cycle turbine for producing electric power; and c) means for supplying in parallel said steam to each steam turbine in each of said modules;

d) wherein each integrated power plant module further comprises a preheater for preheating said organic fluid e) wherein said geothermal liquid is applied to said preheater in each module for preheating said organic fluid.

5. The power plant according to claim 4 further comprising combining means for combining said condensed steam with heat depleted geothermal liquid exiting said preheater, prior to injecting it into said reinjection well.

6. The integrated power plant unit module according to claim 5 further comprising a valve and means for venting non-condensable gases into combined heat depleted geothermal liquid and condensate after said well, prior to injecting the gases into said reinjection well.

7. An integrated power plant unit module for producing electric power comprising:

a) a source of steam containing non-condensable gases;

b) a steam turbine response to said steam for producing power and heat depleted steam;

c) means for supplying said steam to said steam turbine;

d) a steam condenser associated with said steam turbine for receiving said gases and said heat depleted steam;

e) means for indirectly cooling said steam condenser with organic fluid;

f) means for compressing said non-condensable gases received in said steam condenser;

g) a closed organic Rankine cycle turbine operating on said organic fluid for producing power; and h) a single electric generator interposed between and driven individually by both said steam turbine and said organic Rankine cycle turbine for producing electric power.

8. A power plant according to claim 7 wherein said steam condenser is constructed and arranged such that it operates at a pressure no less than atmospheric pressure for collecting non-condensable gases.

9. A power plant comprising:

a) a source of high pressure steam;

b) a plurality of integrated power plant unit modules each having a steam turbine responsive to said high pressure steam for producing power and heat depleted steam at a lower pressure, a steam condenser associated with the steam turbine for condensing said heat depleted steam, a source of organic fluid, means for applying said organic fluid to said condenser for vaporizing said organic fluid, a closed organic Rankine cycle turbine operating on said vaporized organic fluid for producing power and producing heat depleted vaporized organic fluid, an organic fluid condenser for condensing said heat depleted organic fluid, means for returning the resultant condensate to said source of organic fluid, and electric generator means connected to said steam and said organic fluid turbine for producing electric power; and b) means for supplying said high pressure steam in parallel to each of said modules;

c) wherein the generating means in each module is in the form of a single electric generator interposed between and driven by the steam and organic Rankine cycle turbines, and including selectively operable connecting means for selectively connecting said electric generator to the steam and organic Rankine cycle turbines.

10. The power plant according to claim 9 wherein the said modules operate on stand-by in accordance with selective operation of said clutch means in the modules.

11. A power plant according to claim 9 wherein the steam condenser in each of said modules operates at a pressure no less than atmospheric pressure for collecting non-condensable gases.

12. A power plant comprising:

a) a source of high pressure steam-based geothermal fluid and means for dividing the fluid into high pressure steam and brine;

b) a plurality of integrated power plant unit modules each having a steam turbine responsive to said high pressure steam for producing power and heat depleted steam at a lower pressure, a steam condenser associated with the steam turbine for receiving said heat depleted steam, means for applying organic fluid to said condenser for condensing said heat depleted steam and vaporizing said organic fluid, a closed organic Rankine cycle turbine operating on said vaporized organic fluid for producing power and producing heat depleted vaporized organic fluid, an organic fluid condenser for condensing said heat depleted organic fluid, means for returning the resultant condensate to said steam condenser, and electric generator means connected to said steam and said organic fluid turbine for producing electric power; and b) means for supplying said high pressure steam in parallel to each of said modules;

c) wherein said steam condenser is constructed and arranged such that it operates at a pressure no less than atmospheric pressure for collecting non-condensable gases; and d) compressor means for compressing non-condensable gases from each steam condenser of said modules and returning the compressed gases to an injection well.

13. A power plant according to claim 12 including:

a) a preheater associated with each module for preheating organic fluid before it is returned to said steam condenser of the module with which the preheater is associated; and b) means for supplying the preheater of each module with liquid derived from said geothermal fluid.

14. A power plant according to claim 13 wherein means for supplying is constructed and arranged so that said brine is supplied in parallel to the preheater of each module.

15. A power plant according to claim 12 wherein said organic fluid is pentane.

16. A power plant according to claim 13 wherein said liquid is said brine.

17. A power plant according to claim 12 wherein the condensed, heat-depleted steam produced by the condenser of each of said modules, is returned to an injection well.

18. A power plant according to claim 17 wherein the injection well to which the condensed, heat-depleted steam is returned is the same injection well as that to which said compressed gasses are returned.

19. A power plant according to claim 17 wherein said compressed gasses are combined with the condensed, heat-depleted steam from each module before being returned to the injection well.

20. The integrated power plant unit module according to claim 13 wherein said liquid derived from said geothermal fluid is brine.

21. A power plant according to claim 12 including means for combining condensed steam with said brine and injecting the combined condensed steam and brine into a re-injection well.

22. A power plant according to claim 21 including means for adding said compressed gases to the combined condensed steam and brine before injection into the re-injection well.

23. A power plant according to claim 12 including means for injecting the condensed steam into a re-injection well.

24. A power plant according to claim 23 including means for adding said compressed gases to the condensed steam before injection into the re-injection well.

25. A power plant according to claim 12 wherein said organic fluid is pentane.

26. A power plant according to claim 12 wherein the generator of each module is a single electric generator interposed between and driven individually by both said stream turbine and said organic Rankine cycle turbine of the module.

27. A power plant comprising:

a) a source of high pressure steam;

b) a plurality of integrated power plant unit modules each having a steam turbine responsive to said high pressure steam for producing power and heat depleted steam at a lower pressure, a steam condenser associated with the steam turbine for condensing said heat depleted steam, a source of organic fluid, means for applying said organic fluid to said condenser for vaporizing said organic fluid, a closed organic Rankine cycle turbine operating on said vaporized organic fluid for producing power and producing heat depleted vaporized organic fluid, an organic fluid condenser for condensing said heat depleted organic fluid, means for returning the resultant condensate to said source of organic fluid, and a single electric generator connected to said steam turbine and said organic fluid turbine for producing electric power; and b) means for supplying said high pressure steam in parallel to each of said modules;

c) including control means in each module comprising a monitor for monitoring the electric power level of said electric generator means, and for controlling the amount of steam supplied to said steam turbine in the module in accordance with the electric power level.

28. A power plant according to claim 27 wherein said electric generator is interposed between and driven individually by both said steam turbine and said organic fluid turbine.

29. A power plant according to claim 27 wherein said organic fluid is pentane.

30. A power plant according to claim 27 wherein said steam condenser operates at a pressure no less than atmospheric pressure for collecting non-condensable gases in said steam and condensing said heat depleted steam and vaporizing organic fluid applied to said condenser.

31. A power plant operating on geothermal fluid for producing electric power comprising:

a) a separator for separating said geothermal fluid into geothermal steam containing non-condensable gases, and into geothermal liquid;

b) at least one integrated power plant unit module having a steam turbine responsive to said steam and producing heat depleted steam, a steam condenser associated with said steam turbine operating at a pressure no less than atmospheric pressure for collecting non-condensable gases and condensing said heat depleted steam and vaporizing organic fluid applied to said condenser, a closed organic Rankine cycle turbine operating on said organic fluid, and a single electric generator driven by said steam turbine and said organic Rankine cycle turbine for producing electric power; and c) said at least one integrated power plant module further comprises a preheater for preheating said organic fluid before it is vaporized; and e) means for applying said geothermal liquid to said preheater for preheating said organic fluid.

32. A power plant according to claim 31 wherein said means for applying said geothermal liquid is constructed and arranged so that heat in said liquid is transferred to liquid organic fluid only.

33. A power plant according to claim 31 including means for compressing non-condensable gases collected in said steam condenser, and means for venting the compressed non-condensable gases into an injection well.

34. A power plant according to claim 31 including selectively operable connecting means for selectively connecting said electric generator to the steam and organic Rankine cycle turbines.

35. A power plant according to claim 31 comprising a plurality of integrated power plant unit modules as set forth in subpararaph b) of claim 31 including means for applying said geothermal steam to each of said modules in parallel.

36. An integrated power plant unit module for producing electric power comprising:

a) a source of steam;

b) a steam turbine responsive to said steam for producing power and heat depleted steam;

c) means for supplying said steam to said steam turbine;

d) a steam condenser associated with said steam turbine for receiving said heat depleted steam;

e) means for indirectly cooling said steam condenser with organic fluid thereby producing vaporized organic fluid;

f) a closed organic Rankine cycle turbine operating on said vaporized organic fluid for producing power; and g) a single electric generator interposed between and driven individually by both said steam turbine and said organic Rankine cycle turbine for producing electric power.

37. A power plant according to claim 36 wherein said source produces geothermal fluid having a steam component and a brine component, and including:

a) a preheater for preheating organic fluid before it is supplied to said steam condenser; and b) means for supplying said preheater with fluid derived from said geothermal fluid.

38. A power plant according to claim 37 wherein the fluid derived from said geothermal fluid is brine.

39. A power plant according to claim 37 wherein said organic fluid is pentane.

40. An integrated power plant unit module for use with a steam source that produces steam and non-condensable gases, said module comprising:

a) a steam turbine responsive to said steam for producing power and heat depleted steam;

b) a steam condenser responsive to said heat depleted steam for condensing the same and collecting said non-condensable gases;

c) a source of organic fluid;

d) means for indirectly contacting heat depleted steam in said condenser with organic fluid from said source thereof for vaporizing said organic fluid and condensing said heat depleted steam;

e) an organic vapor turbine responsive to vaporized organic fluid for producing power and heat depleted organic fluid;

f) a condenser for condensing said heat depleted organic fluid into a liquid condensate;

g) means for returning said condensate to said source of organic fluid; and h) a single electric generator interposed between and driven by said steam turbine and said organic vapor turbine for producing power.

41. A power plant according to claim 36 wherein said steam source comprises a pressurized water circuit for transferring heat from a heat source and a flash chamber for producing steam.

42. A method for producing power from geothermal fluid containing non-condensable gases produced by a geothermal production well, and inhibiting release of non-condensable gases into the atmosphere, said method including the steps of:

a) separating said geothermal fluid into geothermal vapor containing steam and non-condensable gases, and geothermal brine;

b) supplying said geothermal vapor to at least one power plant module that includes a steam turbine coupled to a generator, a steam condenser, an organic vapor turbine coupled to a generator, and an organic vapor condenser;

c) expanding said geothermal vapor in said steam turbine for producing power and exhaust steam, and indirectly condensing said exhaust steam in said steam condenser using an organic fluid for producing steam condensate and organic fluid vapor;

d) extracting non-condensable gases from the steam condenser, and compressing said non-condensable gases for producing compressed non-condensable gases;

e) expanding said organic fluid vapor in said organic vapor turbine for producing power and exhaust organic vapor, and indirectly condensing said exhaust organic vapor in said organic condenser for producing organic fluid condensate which is supplied to said steam condenser;

f) extracting additional heat from said geothermal fluid without flashing the fluid, and using the additional extracted heat for useful purposes; and g) injecting the compressed non-condensable gases into a re-injection well.

43. A method according to claim 42 including injecting the geothermal brine derived from the geothermal fluid into the re-injection well after heat has been extracted therefrom.

44. A method according to claim 42 including using said extracted heat for preheating said organic fluid condensate before the latter is supplied to said steam condenser.

45. A method according to claim 42 wherein the geothermal fluid from which heat is extracted without flashing the fluid is said geothermal brine which is heat-depleted as a result, and the extracted heat is used to preheat said organic fluid condensate before the latter is supplied to said steam condenser.

46. A method according to claim 45 including injecting the heat-depleted geothermal brine into a re-injection well.

47. A method according to claim 46 including adding said steam condensate to said heat-depleted geothermal brine for producing a mixture, introducing the compressed non-condensable gases into said mixture to produce an effluent, and injecting the effluent into a re-injection well.

48. A method according to claim 42 including injecting the steam condensate into the re-injection well.

49. A method according to claim 48 including adding said steam condensate to said geothermal brine for producing a mixture, introducing the compressed non-condensable gases into the mixture to produce an effluent, and injecting the effluent into a re-injection well.

50. A method according to claim 42 including supplying said geothermal vapor to a plurality of power plant modules each of which includes a steam turbine coupled to a generator, a steam condenser, an organic vapor turbine coupled to a generator, and an organic vapor condenser; and carrying out steps c) to g) of claim 42.

51. A method according to claim 42 including interposing a single electric generator between said steam turbine and said organic vapor turbine.

52. A method according to claim 50 including supplying said geothermal vapor in parallel to said plurality of power plant modules.

53. Apparatus for producing power from geothermal fluid containing non-condensable gases produced by a geothermal production well, and inhibiting release of said non-condensable gases into the atmosphere, said apparatus comprising:

a) a separator for separating said geothermal fluid into geothermal vapor containing steam and non-condensable gases, and geothermal brine;

b) a plurality of power plant module each of which includes a steam turbine coupled to a generator, a steam condenser containing an organic fluid, an organic vapor turbine coupled to a generator, and an organic vapor condenser;

c) means for supplying said geothermal vapor, in parallel, to the steam turbines of said modules whereby said geothermal vapor expands in said steam turbines for producing power and exhaust steam;

d) means in each of said modules for supplying exhaust steam produced by the steam turbine in the module to the steam condenser in the module thereby producing steam condensate and organic fluid vapor;

e) means in each of said modules for supplying organic fluid vapor produced by the steam condensate in a module to the organic vapor turbine in the module whereby said organic vapor expands in the organic vapor turbine for producing power and exhaust organic vapor; and e) means in each of said modules for supplying exhaust organic vapor produced by the organic vapor turbine in a module to the organic vapor condenser in the module thereby producing organic fluid condensate, and means for supplying said organic fluid condensate in the module to the steam condenser in the module.

54. An integrated power plant unit module for producing electric power from a source of geothermal fluid that produces steam containing non-condensable gases and brine, said power plant comprising:

a) a steam turbine operating on steam from said source for producing power and heat depleted steam;

b) a steam condenser for receiving said heat depleted steam;

c) means for indirectly cooling said steam condenser with liquid organic fluid thereby producing vaporized organic fluid and steam condensate;

d) a closed organic Rankine cycle turbine operating on said vaporized organic fluid for producing power and heat depleted organic vapor;

e) an organic fluid condenser for condensing said heat depleted organic vapor into liquid organic fluid;

f) means for returning said organic liquid to said steam condenser;

g) means driven by the steam and organic vapor turbines for producing electric power;

h) a preheater for preheating said organic liquid before it is supplied to said steam condenser; and i) means for supplying said preheater with geothermal fluid from said source.

55. A unit module according to claim 54 wherein the geothermal fluid supplied to said preheater is brine.

56. A unit module according to claim 55 wherein said organic fluid is pentane.

57. A unit module according to claim 54 wherein the means driven by the steam and the organic vapor turbines for producing power is a single electric generator interposed between and driven individually by the turbines.

58. A unit module according to claim 54 including means for returning said steam condensate to a re-injection well.

59. A unit module according to claim 58 including means for compressing non-condensable gases collected in the steam condenser, and means for venting the compressed non-condensable gases into a re-injection well.

60. A unit module according to claim 59 including means for combining the compressed non-condensable gases with the steam condensate before the mixture is returned to the same re-injection well.

61. A power plant comprising a plurality of unit modules according to claim 54 including means for supplying steam from said source in parallel to the steam turbine in each unit module, and means for supplying brine from said source in parallel to the preheater in each unit module.

62. A power plant comprising:

a) a source of high pressure steam;

b) a plurality of integrated power plant unit modules each having a steam turbine responsive to said high pressure steam for producing power and heat depleted steam at a lower pressure, a steam condenser containing an organic fluid for condensing said heat depleted steam, and for vaporizing said organic fluid, a closed organic Rankine cycle turbine for receiving said vaporized organic fluid and producing power and heat depleted vaporized organic fluid, an organic fluid condenser for condensing said heat depleted organic fluid into a liquid, means for returning the resultant said liquid to said steam condenser, an electric generator connected to said steam turbine and said organic fluid turbine for producing electric power, and a control valve for controlling the flow of steam to said steam turbine;

c) means for supplying steam from said source of high pressure steam in parallel to the control valve of each module; and d) control means for controlling the operation of the control valves of said modules such that, under any electrical load on the power plant, the control valve of only one module is adjustable, and the control valves of the other modules are either fully open or fully closed.

* * * * *